United States Patent [19]
Woznicki et al.

[11] 3,909,284
[45] Sept. 30, 1975

[54] LAKE PROCESS

[75] Inventors: Edward J. Woznicki, Douglassville; Charles A. Signorino, King of Prussia, both of Pa.

[73] Assignee: Colorcon Incorporated, West Point, Pa.

[22] Filed: Dec. 26, 1973

[21] Appl. No.: 427,819

[52] U.S. Cl. .............................................. 106/289
[51] Int. Cl.² ........................................ C09B 63/00
[58] Field of Search ............. 106/289; 423/625, 629

[56] References Cited
UNITED STATES PATENTS
| | | | |
|---|---|---|---|
| 3,459,572 | 8/1969 | Lee | 106/289 |
| 3,716,388 | 2/1973 | Lopez et al. | 106/289 |
| 3,773,918 | 11/1973 | Beekman | 423/629 |

*Primary Examiner*—Patrick P. Garvin
*Assistant Examiner*—J. V. Howard
*Attorney, Agent, or Firm*—Smith, Harding, Earley & Follmer

[57] ABSTRACT

A method of making dry edible non-toxic color lakes approved for food and drug use and of submicron particle size, comprising the steps of dissolving sodium bicarbonate in water at a temperature not higher than 13°C., stirring aluminum chloride slowly into the cold sodium bicarbonate solution for about 2 hours, precipitating alumina hydrate, stirring the precipitated alumina hydrate for an additional half hour to insure the completion of the reaction, dissolving a dye in water, stirring the dye solution into the alumina hydrate slurry, adding a thin stream of aluminum chloride to the alumina hydrate slurry with stirring until the pH of the slurry reaches between about 4.1 to 4.3 to effect laking, continuing the slow stirring until the water-soluble dye has been completely absorbed onto the alumina hydrate, filtering the slurry in a filter press to form a filter cake, washing the filter cake with water to reduce the sodium chloride content thereof, drying the filter cake at 50°C. to produce a dry cake of agglomerated lake particles, and grinding the cake of agglomerated lake particles into lake particles of average size of 1 micron, with the majority of particles being submicron in size.

17 Claims, No Drawings

LAKE PROCESS

BACKGROUND OF THE INVENTION

This invention relates to dry, edible, FD&C and D&C lakes which are non-toxic and are approved by the FDA for food, drug and cosmetic use. Such color lakes are useful in coloring coatings for coating pharmaceutical, confectionery and food tablets as in U.S. Pat. No. 3,054,724, and in Colorcon, Inc. U.S. Pat. Nos. 3,524,756; 3,576,663; and 3,694,237.

The art of making lakes is discussed in an article entitled "A Review Of The Literature On Color Lakes" which appeared in *AMERICAN DYE-STUFF REPORTER*, volumn 35, No. 23, Nov. 18, 1946.

The art of making lakes is exemplified by Immerheiser U.S. Pat. No. 833,602 which issued on Oct. 16, 1906, and Curtis Pat. No. 2,053,208 which issued on Sept. 1. 1936.

Immerheiser makes lakes by reacting alum (aluminum sulfate) with soda (sodium carbonate), such as in Example 3 in the Immerheiser patent, by mixing the sodium carbonate into a solution of the aluminum sulfate to precipitate alumina hydrate (aluminum hydroxide). The sodium sulfate which is formed during the precipitation of the alumina hydrate is washed off, a dye solution is mixed into the alumina hydrate slurry, and aluminum chloride is added to cause the dye to absorb onto the alumina hydrate particules to form a lake. However, this process has a serious disadvantage in that the sodium sulfate must be washed from the hydrate requiring a filtration and washing step before laking.

The Curtis patent illustrates a method of precipitating alumina hydrate which produces less of the objectionable by-product, sodium sulfate, but illustrates the patented problem of forming glassy hydrates.

FD&C color aluminum lakes are defined by U.S. Food and Drug Administration as any lake made by extending on a substratum of alumina (alumina hydrate), a salt prepared from one of the certified water-soluble straight colors by combining such color with the basic radical aluminum.

FD&C color aluminum lakes are presently manufactured by adding a solution of a certified FD&C water-soluble dye to an aqueous slurry of a suitable alumina hydrate and effecting the laking with an aluminum salt such as aluminum chloride. These lakes usually have a dye content between 10 and 40%. Suitable alumina hydrate is generally prepared from solutions of aluminum sulfate and sodium carbonate. Alumina hydrate so precipitated must be washed with large quantities of water to rid the base of the soluble sodium sulfate formed during the precipitation.

The presence of sulfates prevents the dye from being absorbed on the hydrate base. Not only does the sulfate prevent absorption, but if you put a lake in the presence of the sulfate, the sulfate ions strip the dye off the hydrate.

An alumina hydrate base which does not contain sodium sulfate and consequently does not need to be washed extensively is manufactured from aluminum chloride and sodium carbonate. The lakes manufactured using this alumina hydrate tend to become hard and glassy on drying and are not suitable for use as dry FD&C color aluminum lakes.

In general, any base, such as sodium carbonate or sodium hydroxide, added to aluminum sulfate or aluminum chloride, will produce alumina hydrate, which forms the substrate for the lake. The object is to get good absorption in the precipitated alumina hydrate particles and yield a cake that does not dry hard and glassy, but rather is soft and grindable

SUMMARY OF THE INVENTION

Accordingly, it is an object of this invention to provide a process for making a lake wherein the alumina hydrate is a smooth, flocculent precipitate which yields a lake that is easy to grind, and yet which does not produce the objectionable by-product sodium sulfate which must be washed out of the hydrate due to interference with the laking.

We have found that aluminum chloride solution and sodium bicarbonate solution can be reacted under proper conditions to produce a lake substrate which does not contain soluble sodium sulfate and when laked with a certified watersoluble FD&C color does not dry hard and glassy. We have found that the combination of aluminum chloride and sodium bicarbonate when precipitated at temperatures of 10°C. or lower, produces a superior alumina hydrate. This hydrate when laked with FD&C soluble colord yields lakes which are soft when dried and exhibit improved light stability, tinting strength and bleed resistance. It should be understood that temperatures from ambient to 10°C. produce lakes with improved characteristics as the temperature drops. We find however that the preferred hydrate is produced at temperatures of 10°C. or lower.

Accordingly, the objects of the invention are accomplished by providing a process which includes stirring aluminum chloride into the sodium bicarbonate solution at temperatures not higher than about 13°C. The unexpected and surprising result is that the alumina hydrate so produced yields lakes that are soft and easy to grind, instead of the hard, horny, glassy material that would normally be expected. A second beneficial result is that due to the absence of sodium sulfate, the hydrate need not be filtered and washed and lakes produced are superior in tinting strength, lack of bleed, and light stability.

DESCRIPTION OF THE PREFERRED EMBODIMENTS

The method of making dry edible non-toxic color lakes approved for food and drug use and of submicron size, in accordance with this invention, comprises the steps of dissolving sodium bicarbonate in water at a temperature not higher than 13°C. with pH about 8.0, and adding aluminum chloride solution (pH about 2.5) slowly with stirring into the cold sodium bicarbonate solution at about 10°C. for about two hours, which precipitates alumina hydrate with a final pH being about 5.5.

In our new process of producing lakes, we use about a 7% solution of sodium bicarbonate which is a nearly saturated solution. The aluminum chloride solution is 32° Be.

The precipitated alumina hydrate is stirred for an additional half hour to insure the completion of the reaction and to allow the $CO_2$ gas to be more completely removed. The hydrate may remain in the tank and solution from which it precipitated, and subsequent laking may proceed without further delay or processing steps. In other words, it is not necessary to remove and wash the hydrate.

A suitable dye is dissolved in water at room temperatures of about 20° to 25°C., and the resulting dye solution is stirred into the alumina hydrate slurry. Then a thin stream of aluminum chloride solution 32° Be is added to the alumina hydrate and dye slurry with stirring until the pH of the slurry reaches between about 4.1 to 4.3 to effect laking.

The aluminum chloride does two things. It converts the dye to an aluminum salt and peptizes the hydrate which makes it more absorbtive to attract a dye and form a lake.

The slow stirring is continued until the water-soluble dye has been completely absorbed onto the alumina hydrate particles. The resulting slurry is pumped into a filter press, and the filter cake formed therein is washed with water to reduce the sodium chloride content thereof.

The useful certified water-soluble FD&C colors are those approved for food use by the U.S. Food and Drug Administration and are referred to in Colorcon U.S. Pat. Nos. 3,524,756; 3,576,663; 3,694,237 and in other U.S. patents, and include but are not limited to FD&C Yellow No. 5, the trisodium salt of 3-carboxy-5-hydroxy-1-p-sulfophenyl-4-p-sulfophenylazo-pyrazole; FD&C Yellow No. 6, the disodium salt of 1-p-sulfophenylazo-2-naphthol-6-sulfonic acid; FD&C Red No. 2, the trisodium salt of 1-(4-sulfo-1-naphthylazo)-2 napthol-3,6-disulfonic acid; FD&C Red No. 3, the disodium salt of 9-o-carbozyphenyl-6-hydroxy-2, 4, 5, 7, tetra iodo-3-isoxanthone; FD&C Red No. 4, the disodium salt of 2-(5-sulfo-2, 4-xylylazo)-1-napthol-4-sulfonic acid; FD&C Red No. 40, the disodium salt of 6-hydroxy-5[(2-methoxy-5-methyl-4-sulfophenyl)azo]-2-naphthalenesulfonic acid; FD&C Blue No. 1, the disodium salt of 4-{[4-(N-ethyl-m-sulfobenzylamino)phenyl] (2-sulfoniumphenyl)-methylene} [ 1-(N-ethyl-N-m-sulfobenzyl)-Δ2,5-cyclohexadienimine]; FD&C Violet No. 1, the monosodium salt of 4-{[4-(N-ethyl-m-sulfobenzylamino)phenyl]-[4-N-ethyl-m-sulfoniumbenzylamino)phenyl]-methylene}-(N,N-dimethyl-Δ2,5-cyclohexadienimine); FD&C Green No. 3, the disodium salt of 4-{[4-(N-ethyl-m-sulfonbenzylamino)phenyl] (4-hydroxy-2-sulfoniumphenyl)-methylene}-[ 1-(N-ethyl-N-m-sulfobenzyl)-Δ2,5-cyclohexadienimine], or any combination of two or more.

The filter cake is dried at about 50°C. to produce a dry cake of agglomerated lake particles and this cake is ground into lake particles of average size of 1 micron, with the majority of particles being submicron in size and some particles ranging up to 40 microns in size.

Stirring the aluminum chloride into the sodium bicarbonate at room temperature (20°C.) produces a hard, glassy alumina hydrate which is undesirable, but if we stir aluminum chloride into sodium bicarbonate at a temperature of 10°C. or lower, we get alumina hydrate of the desired characteristics. As the temperature is decreased from 20°C. to 10°C., the precipitated alumina hydrate keeps improving as the temperature decreases, but after 10°C. there is no noticeable improvement as the temperature is lowered.

Commercial sodium bicarbonate is used in the method, such as is made by Church & Dwight or PPG Industries, Inc., and is U.S.P. grade.

The aluminum chloride solution used is a 32° Be and is a clear, colorless liquid weighing about 10.7 pounds per gallon, freezing below −30°F. and containing approximately 28 weight percent aluminum chloride as $AlCl_3$ (50.5% calculated as $AlCl_3 \cdot 6H_2O$), such as is made by duPont and Chattem Chemicals, Chattanooga, Tenn.

The mixture of 555 parts of sodium bicarbonate to 7,500 parts of water is near the limit of solubility so that more water could be added if that were desirable. The ratio of 555 parts of sodium bicarbonate to 1,000 parts of aluminum chloride is critical in that it gives the 5.5 pH, an acidic pH which is essential at the end of the hydrate precipitation. This is a stoichiometric reaction of the 555 to 1,000 so the reaction should be complete when the solution reaches the pH of 5.5, all the aluminum ions having been precipitated as hydrate.

An excess of aluminum chloride would not only waste aluminum ions, but would change the nature of the hydrate. Excess sodium bicarbonate would cause the solution to remain alkaline and produce some hard, glassy lakes due to the type of alumina hydrate that forms when the mixture is basic in pH.

The following examples specifically illustrate the method of making dry edible non-toxic color lakes approved for food and drug use and of submicron particle size, in accordance with this invention, but in no way limits its range. Parts are expressed in parts by weight, and temperatures are in degrees Centigrade unless otherwise noted.

EXAMPLE 1

555 parts of commercial sodium bicarbonate are dissolved in 7,500 parts of water at a temperature of 13°C. As the sodium bicarbonate dissolves, heat is absorbed which further cools the solution to about 10°C. 1,000 parts of commercial aluminum chloride solution (iron free) 32° Be are added to the bicarbonate solution with stirring at a rate which permits an orderly escape of the carbon dioxide gas generated in the reaction to a pH of 5.5. The precipitated alumina hydrate is stirred for an additional half hour to insure the completion of the reaction. 185 parts of FD&C Yellow No. 5 water-soluble dye (tartrazine) is dissolved in 3,000 parts of water at room temperature, 20°C. This solution is then added to the precipitated hydrate with stirring. Next, 250 parts of 32° Be aluminum chloride solution is added in a thin stream with continuous stirring to a pH of 4.2. Slow stirring is continued until the water-soluble dye has been completely absorbed by the hydrate base. The lake is then filtered in a filter press and washed with water to reduce the chloride content of the finished lake to below 2% and form a filter cake. The filter cake is then dryed in a mechanical convection oven at a temperature at 50°C. The dried lake is then passed through a suitable mill to produce a fine powder.

EXAMPLE 2

The method of example 1 except that the sodium bicarbonate is dissolved in the water at a temperature of 20°C.

EXAMPLE 3

The method of example 1 except that the sodium bicarbonate is dissolved in water at a temperature of 5°C.

EXAMPLE 4

The method of example 1 except that said 250 parts of aluminum chloride solution is added in a thin stream with continuous stirring to a pH of 4.1.

EXAMPLE 5

The method of example 1 except that said 250 parts of aluminum chloride solution is added in a thin stream with continuous stirring to a pH of 4.3.

EXAMPLE 6

The method of example 1 except that the sodium bicarbonate is dissolved in the water at a temperature of 0°C.

EXAMPLE 7

The method of example 1 except that the FD&C Yellow No. 5 water-soluble dye (tartrazine) is dissolved in 3,000 parts of water at a temperature of 60°C.

EXAMPLE 8

The method of example 1 except that FD&C Yellow No. 6 is substituted in like quantity for the FD&C Yellow No. 5 water-soluble dye.

EXAMPLE 9

The method of example 1 except that 92.5 parts of FD&C Yellow No. 5 and 92.5 parts of FD&C Blue No. 1 are used in place of the 185 parts of FD&C Yellow No. 5 dye. The resulting lake has a green color, but otherwise exhibits the same properties as the lakes made using a single water-soluble dye.

EXAMPLE 10

The method of example 1 except that 100 parts of FD&C Yellow No. 5 water-soluble dye (tartrazine) is dissolved in 3,000 parts of water. This produces a lake having a lighter yellow shade than the yellow lake produced by the method of example 1.

The quantity of dye may be varied to produce various shades of lake.

EXAMPLE 11

The method of example 1 except that instead of drying the filter cake in a mechanical convection oven, the filter cake is reslurried by adding water, and then is dried by passing the slurry in one pass through a spray dryer having an inlet temperature of about 300°C. and an outlet temperature of about 80°C. The dry powder produced by the spray dryer may be ground in a suitable mill, if that is thought desirable or necessary.

EXAMPLE 12

The method of example 11 except that the inlet temperature is 350°C. and the outlet temperature is 100°C.

EXAMPLE 13

The method of example 11 except that the inlet temperature is 350°C. and the outlet temperature is 60°C.

EXAMPLE 14

The method of example 11 except that the inlet temperature is 250°C. and the outlet temperature is 100°C.

EXAMPLE 15

The method of example 11 except that the inlet temperature is 250°C. and the outlet temperature is 60°C.

We claim:

1. A method of making dry edible non-toxic color lakes approved for food and drug use and of submicron particle size, comprising the steps of dissolving sodium bicarbonate in water at a temperature not higher than 20°C., stirring aluminum chloride into the sodium bicarbonate solution, the proportion of sodium bicarbonate to aluminum chloride being about 555 to 1,000 in parts by weight, the final pH being about 5.5, precipitating alumina hydrate, stirring a dye solution approved by FDA for ingestion and containing an acid group for forming an aluminum salt into the alumina hydrate slurry, stirring aluminum chloride into the slurry to effect laking, forming a filter cake, washing the filter cake with water to reduce the sodium chloride content thereof, and drying the filter cake to produce a dry cake of agglomerated lake particles, whereby producing a lake which is brighter, more bleed free, more light stable, and of superior tinting strength.

2. The method of claim 1, including grinding said dry cake of agglomerated lake particles into lake particles of an average size of about 1 micron.

3. The method of making lakes according to claim 1, including stirring the aluminum chloride slowly into the cold sodium bicarbonate solution for about two hours to a pH of 5.5, and stirring the precipitated alumina hydrate for an additional half hour to insure complete reaction.

4. The method of making lakes according to claim 1 including dissolving a dye in water at temperatures of about 20° to 60°C. to form said dye solution, before stirring the dye solution into the alumina hydrate slurry.

5. The method of making lakes according to claim 1 including adding the aluminum chloride to the hydrate-dye slurry in a thin stream with stirring.

6. The method of making lakes according to claim 1 including the step of drying the filter cake at about 50°C. to produce the dry cake of agglomerated lake particles.

7. The method of making lakes according to claim 1 including, in parts by weight, dissolving 555 parts of sodium bicarbonate in 7,500 parts of water at a temperature not higher than about 13°C., stirring 1,000 parts of aluminum chloride solution, iron free, 32° Be into the bicarbonate solution with stirring at a rate which permits an orderly escape of the carbon dioxide gas generated in the reaction to a pH of 5.5, stirring the precipitated alumina hydrate for about a half hour, dissolving 185 parts of FD&C Yellow No. 5 water-soluble dye in 3,000 parts of water at about 20° to 25°C., stirring the dye solution into the precipitated hydrate, adding 250 parts of 32° Be aluminum chloride solution in a thin stream to the hydrate mixture with continuous stirring to a pH range of about 4.1 to 4.3, continuing the slow stirring until the water-soluble dye has been completely absorbed by the hydrate base, filtering the resulting lake to form a filter cake and washing it with water to reduce the chloride content of the finished lake to below 2%, and drying the filter cake.

8. A dry edible non-toxic color lake made in accordance with the method of claim 1.

9. The method of claim 1, wherein the sodium bicarbonate is dissolved in the water at a temperature of about 13°C.

10. The method of claim 1 including reslurrying the filter cake by adding water thereto, and spray drying said slurry.

11. The method of claim 1, including stirring the aluminum chloride into the alumina hydrate slurry to effect laking without washing or isolating the alumina hydrate.

12. The method of making lakes, in parts by weight, by dissolving 555 parts of sodium bicarbonate in 7,500 parts of water at a temperature not higher than about 13°C., stirring 1,000 parts of aluminum chloride solution, iron free, 32° Be into the bicarbonate solution with stirring at a rate which permits an orderly escape of the carbon dioxide gas generated in the reaction to a pH of 5.5, stirring the precipitated alumina hydrate for about a half hour, dissolving 185 parts of FD&C Yellow No. 5 watersoluble dye in 3,000 parts of water at about 20° to 25°C., stirring the dye solution into the precipitated hydrate, adding 250 parts of 32 Be aluminum chloride solution in a thin stream to the hydrate mixture with continuous stirring to a pH range of about 4.1 to 4.3, continuing the slow stirring until the water-soluble dye has been completely absorbed by the hydrate base, filtering the resulting lake to form a filter cake and washing it with water to reduce the chloride content of the finished lake to below 2%, and drying the filter cake to produce a dry cake of agglomerated lake particles, thereby producing a lake which is brighter, more bleed free, more light stable and of superior tinting strength.

13. The method of claim 12, including grinding said dry cake of agglomerated lake particles into lake particles of an average size of about 1 micron.

14. The method of making lakes accordingly to claim 12, including stirring the aluminum chloride slowly into the cold sodium bicarbonate solution for about two hours to a pH of 5.5, and stirring the precipitated alumina hydrate for an additional half hour to insure complete reaction.

15. The method of making lakes according to claim 12 including dissolving a dye in water at temperatures of about 20 to 60°C. to form said dye solution, before stirring the dye solution into the alumina hydrate slurry.

16. The method of making lakes according to claim 12 including the step of drying the filter cake at about 50°C. to produce the dry cake of agglomerated lake particles.

17. The method of claim 12 including reslurrying the filter cake after washing by adding water thereto, and spray drying said slurry.

* * * * *